United States Patent
Plakhov et al.

(10) Patent No.: US 9,910,932 B2
(45) Date of Patent: Mar. 6, 2018

(54) SYSTEM AND METHOD FOR COMPLETING A USER QUERY AND FOR PROVIDING A QUERY RESPONSE

(71) Applicant: YANDEX EUROPE AG, Lucerne (CH)

(72) Inventors: Andrey Grigorievich Plakhov, Moscow (RU); Svetlana Jurievna Shorina, Moscow (RU); Irina Viktorovna Esinovskaya, Moscow (RU); Elena Semenovna Gruntova, Moscow (RU); Vasiliy Aleksandrovich Eremeev, Moscow (RU)

(73) Assignee: YANDEX EUROPE AG, Luzern (CH)

( * ) Notice: Subject to any disclaimer, the term of this patent is extended or adjusted under 35 U.S.C. 154(b) by 258 days.

(21) Appl. No.: 14/915,549

(22) PCT Filed: May 30, 2014

(86) PCT No.: PCT/IB2014/061857
§ 371 (c)(1),
(2) Date: Feb. 29, 2016

(87) PCT Pub. No.: WO2015/028897
PCT Pub. Date: Mar. 5, 2015

(65) Prior Publication Data
US 2016/0210300 A1    Jul. 21, 2016

(30) Foreign Application Priority Data
Aug. 30, 2013 (RU) ............... 2013140370

(51) Int. Cl.
G06F 17/30    (2006.01)
(52) U.S. Cl.
CPC ...... *G06F 17/3097* (2013.01); *G06F 17/3064* (2013.01)

(58) Field of Classification Search
None
See application file for complete search history.

(56) References Cited

U.S. PATENT DOCUMENTS

| 6,128,613 A | 10/2000 | Wong et al. |
| 6,208,339 B1 | 3/2001 | Atlas et al. |

(Continued)

FOREIGN PATENT DOCUMENTS

| RU | 2378680 C2 | 1/2010 |
| WO | 2011096945 A1 | 8/2011 |
| WO | 2012142553 A2 | 10/2012 |

OTHER PUBLICATIONS

International Search Report from PCT/IB2014/061857; Blaine R. Copenheaver; dated Jan. 14, 2015.

(Continued)

*Primary Examiner* — Belix M Ortiz Ditren
(74) *Attorney, Agent, or Firm* — BCF LLP (57) ABSTRACT

There is disclosed a method and a system for completing a search query. The method is executable at a server. The method comprises receiving a portion of the search query from an electronic device associated with a user; determining a query-completion suggestion for the received search query portion, the query-completion suggestion based on information searchable within a vertical search domain; determining the most suitable response to the query based on information maintained within the vertical search domain; causing the electronic device to display the user a suggest line, the suggest line including both: (i) the query-completion suggestion and (ii) representation of the most suitable response to the query.

21 Claims, 4 Drawing Sheets

(56) References Cited

U.S. PATENT DOCUMENTS

| | | | |
|---|---|---|---|
| 6,564,213 B1 | 5/2003 | Ortega et al. | |
| 7,466,859 B2 | 12/2008 | Chang et al. | |
| 8,060,524 B2 | 11/2011 | Schechter et al. | |
| 8,126,875 B2 | 2/2012 | Liu et al. | |
| 8,180,790 B2 | 5/2012 | Sareen et al. | |
| 8,244,750 B2 | 8/2012 | Gade et al. | |
| 8,370,329 B2 | 2/2013 | Gutt et al. | |
| 8,396,885 B2 | 3/2013 | Timm et al. | |
| 8,577,913 B1 * | 11/2013 | Hansson | G06F 17/30 707/767 |
| 8,972,388 B1 * | 3/2015 | Finkelstein | G06F 3/0237 707/723 |
| 2006/0190436 A1 | 8/2006 | Richardson et al. | |
| 2007/0060114 A1 | 3/2007 | Ramer et al. | |
| 2007/0276803 A1 | 11/2007 | Shakib et al. | |
| 2008/0306934 A1 | 12/2008 | Craswell et al. | |
| 2009/0171942 A1 | 7/2009 | Suresh et al. | |
| 2009/0240683 A1 | 9/2009 | Lazier et al. | |
| 2010/0057698 A1 * | 3/2010 | Prasad Kantamneni | G06F 17/30867 707/E17.015 |
| 2010/0312773 A1 * | 12/2010 | Boerries | G06F 17/3064 707/759 |
| 2011/0179017 A1 | 7/2011 | Meyers et al. | |
| 2011/0184951 A1 | 7/2011 | Paparizos et al. | |
| 2011/0238656 A1 | 9/2011 | Hood et al. | |
| 2011/0320470 A1 | 12/2011 | Williams et al. | |
| 2012/0030227 A1 | 2/2012 | Mital et al. | |
| 2012/0047134 A1 | 2/2012 | Hansson et al. | |
| 2012/0084277 A1 | 4/2012 | Barve et al. | |
| 2012/0131032 A1 | 5/2012 | Rakshit | |
| 2012/0246165 A1 | 9/2012 | Batraski et al. | |
| 2013/0046777 A1 | 2/2013 | Mohiuddin et al. | |
| 2013/0054631 A1 | 2/2013 | Govani et al. | |
| 2013/0066896 A1 | 3/2013 | Mehanna et al. | |
| 2013/0080460 A1 | 3/2013 | Tomko et al. | |
| 2013/0117297 A1 | 5/2013 | Liu et al. | |

OTHER PUBLICATIONS

International Preliminary Report on Patentability from PCT/IB2014/061857; Marc Somers; dated Sep. 8, 2015.

* cited by examiner

SYSTEM AND METHOD FOR COMPLETING A USER QUERY AND FOR PROVIDING A QUERY RESPONSE

CROSS-REFERENCE

The present application claims convention priority to Russian Utility Model Application No. 2013140370, filed on Aug. 30, 2013, entitled "СИСТЕМА И СПОСОБ ЗАВЕРШЕНИЯ ПОЛЬЗОВАТЕЛЬСКОГО ЗАПРОСА И ПРЕДОСТАВЛЕНИЯ ОТВЕТА НА ЗАПРОС". This application is incorporated by reference herein in its entirety.

FIELD

The present technology relates to search engines in general and specifically to a system and method for completing a user query and for providing a query response.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access rich content (like images, audio, video, animation, and other multimedia content from such networks).

Generally speaking, a given user can access a resource on the communication network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

For example, the given user may be interested in viewing pictures of Britney Spears, but may not be aware of a particular resource that would present such information. Alternatively, the given user may be interested in locating the closest Starbucks coffee shop, but again may not be aware of a particular web resource to provide such location services. In these fictitious (yet practical) circumstances, the given user may run a web search using the search engine.

When the given user runs a web search using the search engine, she generally has two priorities. She wants the search engine to locate the most relevant results and she wants the results relatively fast. To at least partially address these concerns, it is known to present the user using a search engine query completion suggestions. For example, in response to a user typing a query "Britney" into the Google™ search engine, the user gets a list of suggestions in a drop down menu, namely "Britney Spears", "Britney Spears ooh la la", "Britney Spears songs", "Britney Haynes".

The general idea behind the suggestions is to simplify the user experience and enable a more user-friendly search experience. If the user were indeed looking for Britney Spears, by clicking on the suggest line "Britney Spears", the user is displayed (without having to actually type up the whole query) with a search result page displaying various links and snippets of web site about Britney Spears. The user then can browse the search results and select a link that she is desirous of perusing.

US patent application 2012/0246165 published on Sep. 27, 2012 to Batraski et al teaches a system and method for presenting content in response to receiving a portion of a search query. A computing device receives, over a network from a user computer, a portion of a search query submitted by a user in a search query entry area. The computing device receives, from a search suggestion module, one or more search suggestions related to the portion of the query. The computing device transmits, to the user computer, the one or more search suggestions for display in a search suggestion region, the search suggestion region displayed differently than a search results area. The computing device transmits a search suggestion of the one or more search suggestions to a rich content module. The rich content module generates rich content related to the transmitted search suggestion. The computing device transmits, to the user computer, the rich content for display in the search suggestion region.

SUMMARY

It is an object of the present technology to ameliorate at least some of the inconveniences present in the prior art.

In one aspect, implementations of the present technology provide a method of completing a search query. The method can be executable at a server. The method comprises: receiving a portion of the search query from an electronic device associated with a user; determining a query-completion suggestion for the received search query portion, the query-completion suggestion based on information searchable within a vertical search domain; determining the most suitable response to the query based on information maintained within the vertical search domain; causing the electronic device to display the user a suggest line, the suggest line including both: (i) the query-completion suggestion and (ii) representation of the most suitable response to the query.

In another aspect, implementations of the present technology provide a method of completing a search query. The method can be executable at a server and the method comprises: receiving a portion of a search query from an electronic device associated with a user; determining a first query-completion suggestion for the received search query portion, the first query-completion suggestion based on information searchable within a first vertical search domain; determining a second query-completion suggestion for the received search query portion, the second query-completion suggestion based on information searchable within a second vertical search domain; determining a first most suitable response to the query based on information maintained within the first vertical search domain and determining a second most suitable response to the query based on information maintained within the second vertical search domain; causing a user device to display to the user: on a first line of a suggest box, a first suggest line, the first suggest line including both: (i) the first query-completion suggestion and (ii) representation of the first most suitable response to the query; and on a second line of the suggest box, a second suggest line, the second suggest line including both: (i) the second query-completion suggestion and (ii) representation of the second most suitable response to the query.

In a third aspect, implementations of the present technology provide a system for completing a search query, the system comprising a server. The server is configured to: receive a portion of the search query from an electronic device associated with a user; determine a query-completion suggestion for the received search query portion, the query-completion suggestion based on information searchable within a vertical search domain; determine the most suitable response to the query based on information maintained within the vertical search domain; cause the electronic device to display the user a suggest line, the suggest line including both: (i) the query-completion suggestion and (ii) representation of the most suitable response to the query.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
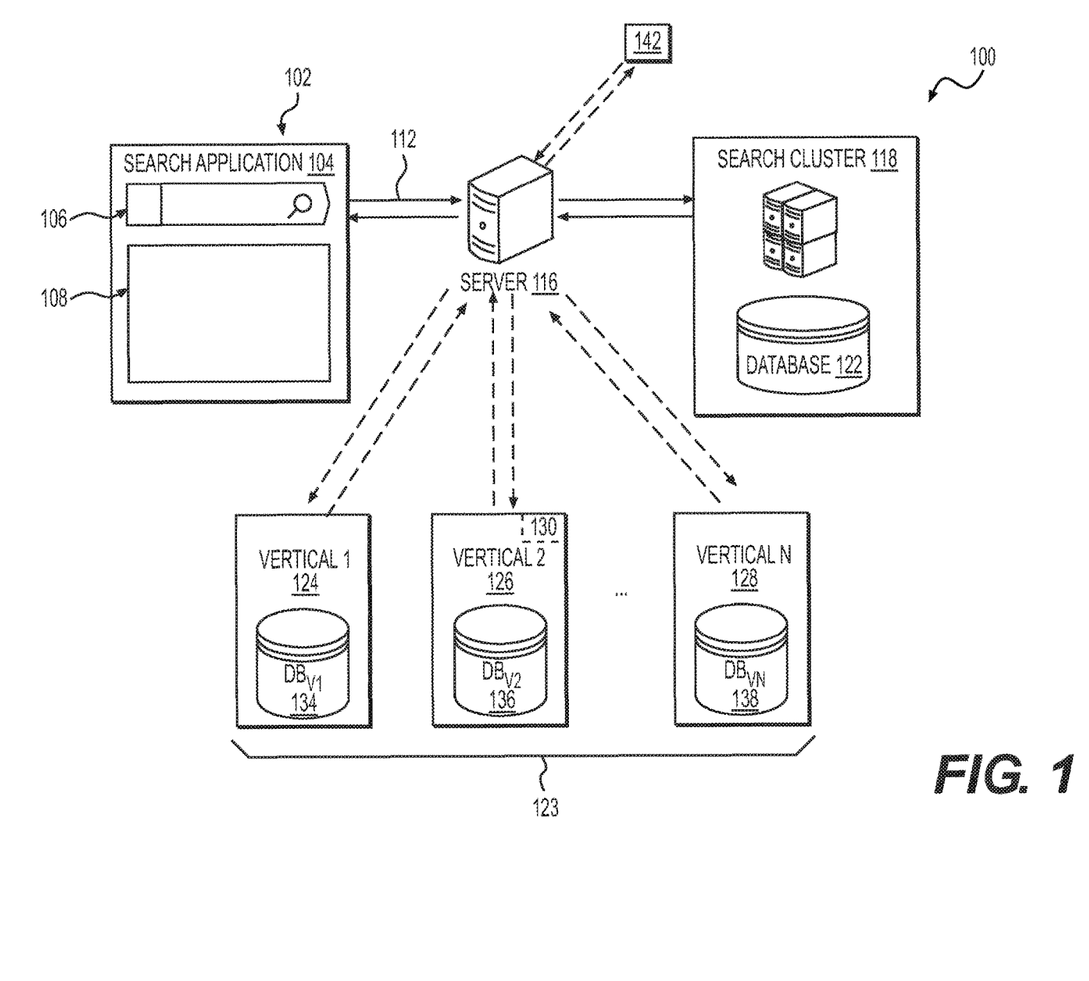
FIG. 1 is a schematic diagram depicting a system 100, the system 100 being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to receive search queries and to conduct general and vertical searches in response thereto, as well as to process search queries in accordance with non-limiting embodiments of the present technology. As such, any system variation configured to process user search queries can be adapted to execute embodiments of the present technology, once teachings presented herein can be appreciated.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless communication device (such as a smartphone, a cell phone, a tablet and the like), as well as network equipment (such as routers, switches, and gateways). The electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web search using the above-mentioned search engine.

How the search application 104 is implemented is not particularly limited. One example of the search application 104 may include a user accessing a web site associated with a search engine to access the search application 104. For example, the search application can be accessed typing in an URL associated with Yandex search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited) to those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Generally, speaking, the search application 104 comprises a query interface 106 and a search result interface 108. The general purpose of the query interface 106 is to enable the user (not depicted) to enter her query or a "search string". The general purpose of the search result interface 108 is to provide search results that are responsive to the user query entered into the query interface 106. How the user query is processed and how the search results are presented will be described in detail herein below.

Also coupled to the communication network is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware and/or software and/or firmware. In the depicted non-limiting embodiment of present technology, the server 116 is a single server. In alternative non-limiting embodiments of the present technology, the functionality of the server 116 may be distributed and may be implemented via multiple servers.

The electronic device 102 is configured to communicate with the server 116 over a communication link 112. Generally speaking, the communication link 112 enables the electronic device 102 to access the server 116 via a communication network (not depicted). In some non-limiting embodiments of the present technology, the communication network (not depicted) can be implemented as the Internet. In other embodiments of the present technology, the communication network (not depicted) can be implemented differently, such as any wide-area communication network, local-area communication network, a private communication network and the like.

How the communication link 112 is implemented is not particularly limited and will depend on how the communication device 102 is implemented. Merely as an example and not as a limitation, in those embodiments of the present technology where the electronic device 102 is implemented as a wireless communication device (such as a smart-phone), the communicated link 102 can be implemented as a wireless communication link (such as but not limited to, a 3G communication network link, a 4G communication network link, a Wireless Fidelity, or WiFi® for short, Bluetooth® and the like). In those examples, where the communication device 102 is implemented as a notebook computer, the communication link can be either wireless (such as the Wireless Fidelity, or WiFi® for short, Bluetooth® or the like) or wired (such as an Ethernet based connection).

The server 116 is communicatively coupled (or otherwise has access) to a search cluster 118. According to these embodiments of the present technology, the search cluster 118 performs general searches in response to the user queries inputted via the query interface 106 and outputs search results to be presented to the user using the search results interface 108. Within these non-limiting embodiments of the present technology, the search cluster 118 comprises or otherwise has access to a database 122.

The server 116 is further communicatively coupled (or otherwise has access) to a plurality of vertical search modules 123. In the depicted embodiment, the plurality of vertical search modules includes a vertical 1 module 124, a vertical 2 module 126 and a vertical N module 128. It should be expressly understood that the number of modules within the plurality of vertical search modules 123 is not meant to be a limitation of embodiments of the present technology.

Merely for the purposes of ease of illustration, it shall be assumed that the vertical 1 module 124 is implemented as a vertical search module for searching maps and other geographical information. As such, it can be said that the vertical 1 module 124 implements a map vertical search engine or, simply, a map service.

Furthermore, it shall be assumed that the vertical 2 module 126 is implemented as a vertical search module for weather related information. As such, it can be said that the vertical 2 module 126 implements a weather vertical search engine or, simply, a weather service. For the various examples to be provided herein below, it shall be assumed, selectively, that the vertical N search module 128 implements one of sports news, movies, translation or movie theater services. It should be expressly understood that a number of additional or different services can be implemented as part of the plurality of vertical search modules 123.

It should be also expressly understood that in order to simplify the description presented herein below, the configuration of the search cluster 118 has been greatly simplified. It is believed that those skilled in the art will be able to appreciate implementational details for the search cluster 118 and for components thereof.

In various non-limiting embodiments of the present technology, any given one of the plurality of vertical search modules 123 comprises or has access to one or more databases. These one or more databases host data associated with the particular services implemented by the given one of the plurality of vertical search modules 123.

To that extent, the vertical 1 module 124 has access to a database $DB_{V1}$ 134. Recalling that the vertical 1 module 124 implements a map service, the database $DB_{V1}$ 134 contains information related to geographical location of various objects and the associated maps. The vertical 2 module 126 has access to a database $DB_{V2}$ 136. Recalling that the vertical 2 module 126 implements a weather service, the database $DB_{V2}$ 136 can host a repository of various weather related forecasts. By the same token, the vertical N module 128 has access to a database $DB_{VN}$ 138. Recalling that the vertical N module 128 implements selectively one of sports news, movies, translation or movie theater services, the database $DB_{VN}$ 138 can host a repository of data associated with the respective selective service.

Additionally or optionally and, as known to those skilled in the art, the one or more databases (such as the database $DB_{V1}$ 134, $DB_{V2}$ 136 and $DB_{VN}$ 138) may be segregated into one or more separate databases. These segregated databases may be portions of the same physical database (such as the database $DB_{V1}$ 134, database $DB_{V2}$ 136 and database $DB_{VN}$ 138) or may be implemented as separate physical entities. For example, one database within, let's say, the database $DB_{V1}$ 134 could host the most popular/most frequently requested maps for a given area, while another database within the database $DB_{V1}$ 134 could host all the maps available. Needless to say, the above has been provided as an illustration only and several additional possibilities exist for implementing embodiments of the present technology.

Furthermore, it is possible that some of the plurality of vertical search modules 123 may not implement a separate database. This is particularly true, but is not limited to, for example, the vertical 2 module 126 implementing a weather service. In this example, the vertical 2 module 126 implementing the weather service may not have a dedicated database, but may rather have access to a service widget repository 130. The service widget repository 130, which may be implemented as data repository for containing, in this example, weather related data.

Each of the plurality of vertical search modules 123 is configured to perform vertical searches within the respective databases (i.e. database $DB_{V1}$ 134, database $DB_{V2}$ 136 and database $DB_{VN}$ 138). However, it should be noted that the search capabilities of the plurality of vertical search modules 123 are not limited to searching the respective databases (i.e. database $DB_{V1}$ 134, database $DB_{V2}$ 136 and database $DB_{VN}$ 138). As such, the plurality of vertical search modules 123 may perform other searches, as the need may be.

Also, for the purposes of the description presented herein, the term "vertical" (as in vertical search) is meant to connote a search performed on a sub set of a larger set of data, the sub set having been grouped pursuant to an attribute of data. For example, to the extent that the vertical 2 module 126 implements a weather service, the vertical 2 module 126 searches a sub set (i.e. weather related information) of the set of data (i.e. all the data potentially available for searching), the sub set of data being stored in the database $DB_{V2}$ 136.

Within these embodiments of the present technology, the server 116 is configured to access, separately and independently, the search cluster 118 (to perform a general web search, for example) and the plurality of vertical search modules 123 (to perform the vertical searches, for example). In alternative non-limiting embodiments of the present technology, the plurality of vertical search modules 123 can be implemented as part of the search cluster 118. In those embodiments, the search cluster 118 can be responsible for coordinating and executing both the general web searches and the vertical searches. In some embodiments of the present technology, the search cluster 118 can execute a multi layer meta search by executing both the general web search and the vertical searches.

Within the embodiment depicted in FIG. 1, the server 116 is generally configured to (i) conduct searches (by accessing the search cluster 118 and/or the plurality of vertical search modules 123); (ii) execute analysis of search results and perform ranking of search results; (iii) grouping of results and compiling the search result page (SERP) to be outputted to the electronic device 102.

According to non-limiting embodiments of the present technology, the server 116 is further configured to provide query completion suggestions to the user entering a query into the query interface 106. As is known to one skilled in the art, query completion suggestion is a feature, whereby responsive to the user entering a portion of a query, the search application 104 provide possible variants for completing the query. For example, where user has started typing in: "Britney Spears", possible query completion suggestions may include "images", "latest song" and the like.

To that end, the server 116 comprises or have access to a suggest module 142. The operation of the suggest module 142 within the context of providing a query-completion suggestion according to non-limiting embodiments of the present technology will now be described.

Figure 2:
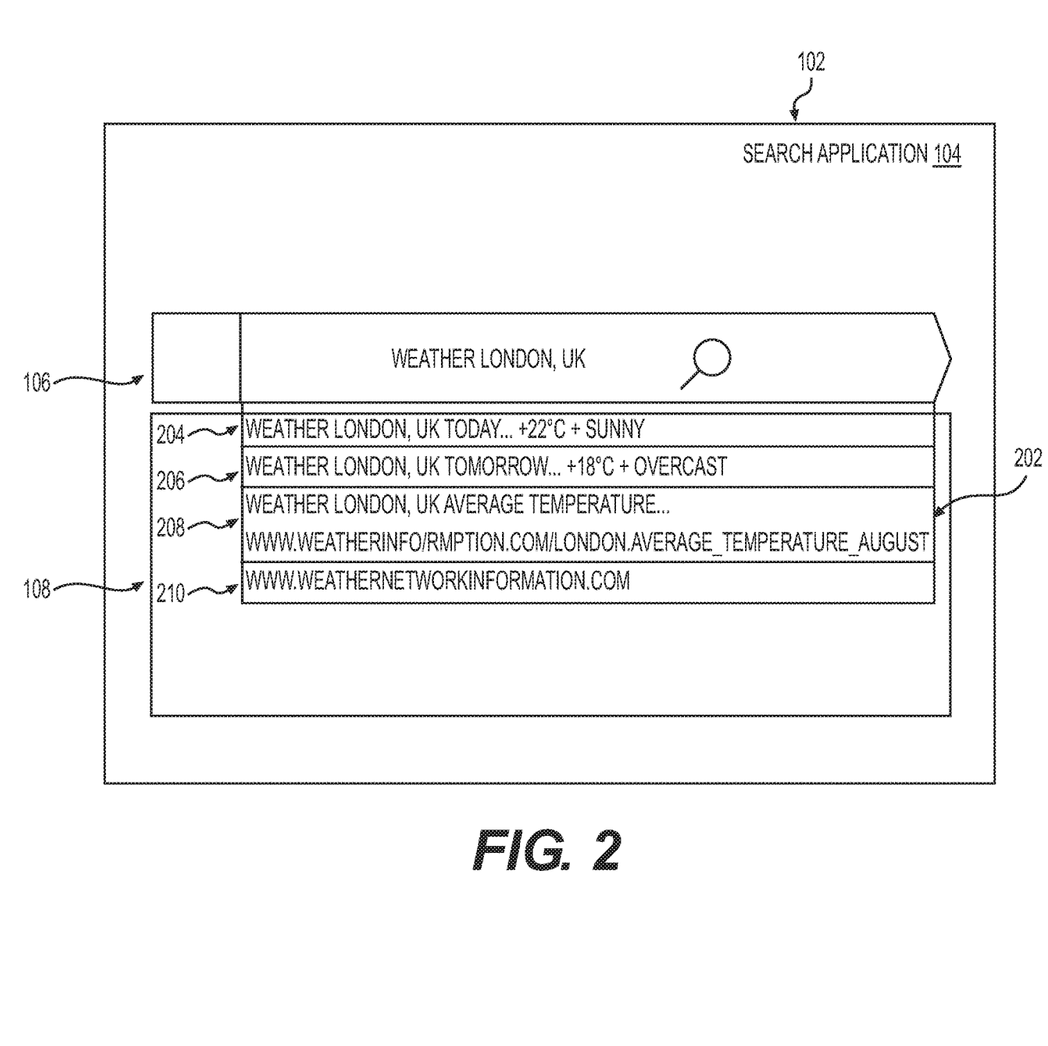
FIG. 2 is a schematic representation of the electronic device 102 of the system 100, the electronic device 102 being implemented in accordance with non-limiting embodiments of the present technology.

In order to fully appreciate implementations of the present technology, an example of the suggest window will be described in greater detail now. With reference to FIG. 2, there is depicted the electronic device 102, much akin to the one in FIG. 1. The search application 104 includes the query interface 106 and the search results interface 108. According to non-limiting embodiments of the present technology, there is also provided a suggest area 202.

Generally speaking, the suggest area 202 is an area of the search application 104 that is separate and different from the search results interface 108. In some embodiments of the present technology and as depicted in FIG. 2, the suggest area 202 overlaps the search results interface 108 and is implemented as a drop down box from the query interface 106. In alternative non-limiting embodiments of the present technology, the suggest area 202 can be located differently relative to the query interface 106 and the search results interface 108.

For example, alternative implementations of the suggest area 202 may include, but are not limited to, the suggest area 202 overlapping both the query interface 106 and the search results interface 108, being positioned next, above or below portions of the query interface 106 and the search results interface 108, and the like.

In alternative non-limiting embodiments of the present technology, the suggest area may replace a portion of the search application 104, one or both of the query interface 106 and the search results interface 108.

In some embodiments of the present technology, the suggest area 202 appears the moment the user has typed enough of a search query into the query interface 106 to enable user query processing, as will be described below. In other words, the suggest area 202 can appear automatically in a sense of not requiring the user to take any affirmative actions. Alternatively, it is possible that the suggest area 202 appears in response to the user positively indicating her intent to use suggest function.

The suggest area 202 has four lines in the depicted illustrative embodiment—a first suggest line 204, a second suggest line 206, a third suggest line 208 and a fourth suggest line 210. It should be expressly understood that the number of lines within the suggest area 202 is not particularly limited. For example, in some embodiments of the present technology, the suggest area 202 can have a single line. In alternative non-limiting embodiments of the present technology, the suggest area 202 can have at least two lines. Alternatively or additionally, the number of lines within the suggest area 202 can be dynamic. In other words, as the suggestion module 142 generates additional alternatives for the query completion suggestions, the number of lines within the suggest area 202 can be dynamically increased.

For the purposes of illustration, it shall be assumed that a given user is interested in determining a weather forecast for London, United Kingdom (UK). To that end, the given user has started entering a portion of a search query "Weather London, UK" into the query interface 106.

According to embodiments of the present technology and, as will be described in greater detail below, the server 116 is configured to cause the search application 104 to output the suggest area 202. According to the non-limiting embodiments of the present technology, as part of generating each of the first suggest line 204, the second suggest line 206, the third suggest line 208 and the fourth suggest line 210 the server 116 causes the search application 104 to display a composite query-completion suggestion and query response line. Put another way, each of the first suggest line 204, the second suggest line 206, the third suggest line 208 and the fourth suggest line 210 comprises the composite query-completion suggestion and query response line, which in turn comprises a query suggest portion and a portion representative of the most suitable response to that query-completion suggestion.

Continuing with the example presented above, non-limiting implementations of the composite query-completion suggestion and query response line may include the following.

The first suggest line 204 may include the following: "Weather London, UK today . . . +22 Celsius and sunny". Within this example the "today" is a portion of the first suggest line 204 generated as a query-completion suggestion and the "+22 Celsius and sunny" is a portion of the first suggest line 204 generated as the portion representative of the most suitable response to the query-completion suggestion.

The second suggest line 206 may include the following: "Weather London, UK tomorrow . . . +18 Celsius and overcast". Within this example the "tomorrow" is a portion of the second suggest line 210 generated as a query-completion suggestion and the "+18 Celsius and overcast" is a portion of the second suggest line 210 generated as the portion representative of the most suitable response to the query-completion suggestion.

The third suggest line 208 may include the following: ""Weather London, UK average temperature . . . www.weatherinformation.com\London_average_temperature_August". Within this example the "average temperature" is a portion of the first suggest line 208 generated as a query-completion suggestion and the "www.weatherinformation.com\London_average_temperature_August" is a portion of the third suggest line 208 generated as the portion representative of the most suitable response to the query-completion suggestion. It should be noted that in this example, the portion representative of the most suitable response to the query-completion comprises a hyper link and the hyper link if fictitious for illustration purposes only.

Finally, http://www.weatherinformation.com/London_average_temperature_August the fourth suggest line 210 may include the following: "www.weathernetworkinformation.com". Within this example the portion of the second suggest line 210 generated as a query-completion suggestion and the portion of the second suggest line 210 generated as the portion representative of the most suitable response to the query-completion suggestion is collapsed into a single entry, which in this case is a link to a resource (which is a fictitious link).

Now, we will turn our attention to how the server 116 generates the above-mentioned examples of the query-completion suggestion and the most suitable response to the query-completion suggestion.

When the user enters a portion of the query into the query interface 106, the server 116 is configured to appreciate an indication of the portion of the search query over the communication link 112 and to transmit the portion of the search query to the suggestion module 142. The suggestion module 142 is configured to generate one or more of the query-completion suggestions and the associated most suitable response thereto.

In one example non-limiting embodiment, the suggestion module 142 can access the above-mentioned plurality of vertical search modules 123. In some embodiments, the suggestion module 142 may access all of the plurality of vertical search modules 123. In other embodiments, the suggestion module 142 may access only a subset of the plurality of vertical search modules 123. The subset of the plurality of vertical search modules 123 may be determined on their relevancy of a given one of the plurality of vertical search modules 123 to the given portion of the search query.

Continuing with our example, the suggestion module 142 may analyze the portion of the search query, namely in this example, "Weather London, UK". Based on the analysis, it may be determined that the most relevant vertical search would be performed by the weather service, namely the vertical 2 module 126.

In alternative non-limiting example, the suggestion module 142 may analyze the portion of the search query, namely in this example, "Weather London, UK". Based on the analysis, it may be determined that the most relevant vertical search would be performed by the weather service and by the wiki service, namely the vertical 2 module 126 (for the weather) and the vertical N module 138 for the wiki service.

In other words, the suggestion module 142 may access a single one of the plurality of search verticals 123, a sub-set of the plurality of vertical search modules 123 or all of the plurality of vertical search modules 123.

Then, based at least in part, on the selected ones of the plurality of vertical search modules 123 (and, more specifically, information searchable within the selected ones of the plurality of vertical search modules 123), the suggestion module 142 first generates the query-completion suggestions. How the suggestion module 142 generates the query-completion suggestions is not particularly limited and may include one or more of: (i) statistical popularity of a given query-completion term based on the portion of the search query; (ii) user-specific popularity of the given query-completion term based on the portion of the search query; (iii) how often a particular portion of the search query is typically used with determinative terms by other users ("images", "movies", "weather" or the like); and (iv) other auxiliary information.

The auxiliary information can be representative of a dynamic parameter (such as time of day, day of the week, month of the year, holidays soon to come and the like). The dynamic parameter is meant to denote a search parameter that is not explicitly included in the search query and that is changeable over time.

For example, in the above-provided example for the third suggestion line 208, the time of the year can be used to augment the "average temperature" with "average temperature for August", assumed that the search query was being entered in the month of August. In other embodiments, if the search query was entered in latter parts of August, the suggestion module 142 may have determined and augmented the query completion suggestion with "average temperature for September".

The suggestion module 142 then generates the most suitable response to each of the generated query-suggested completions. The suggestion module 142 accesses the plurality of vertical search modules 123 (or the subset of the plurality of vertical search modules 123 as has been determined earlier) to retrieve the most suitable response to a hypothetical (or "proxy") query that would include the search query received from the user and the query-completion suggestion generated by the suggestion module 142.

The plurality of vertical search modules 123 (or the subset of the plurality of vertical search modules 123 as has been determined earlier) can determine the most suitable response to such a hypothetical query based on some or all of: (i) determinative words contained in the search query or the query-completion suggest; (ii) stop words contained in the search query or the query-completion suggest and (iii) frequency of a given search query and a response from the given one of the plurality of vertical search modules 123 when other users perform similar search queries.

Alternatively, the most suitable response can be determined by the suggestion module 142, based on the ranked search vertical results received from the plurality of vertical search modules 123 (or the subset of the plurality of vertical search modules 123 as has been determined earlier).

The suggestion module 142 then generates the indication of the most suitable response in association with each of the query-completion suggestion and transmits a trigger which is instrumental in causing the electronic device 102 to generate the above-described suggest area 202 or a portion thereof.

Given the architecture described with reference to FIG. 1 and an example provided in FIG. 2, it is possible to execute a method of completing a user query and providing a query response. The method of completing a user query and providing a query response can be conveniently executed on the server 116. To that end, the server includes computer usable information storage medium storing computer instructions, which instructions when executed, cause the server 116 to execute steps of the method described herein below.

Figure 3:
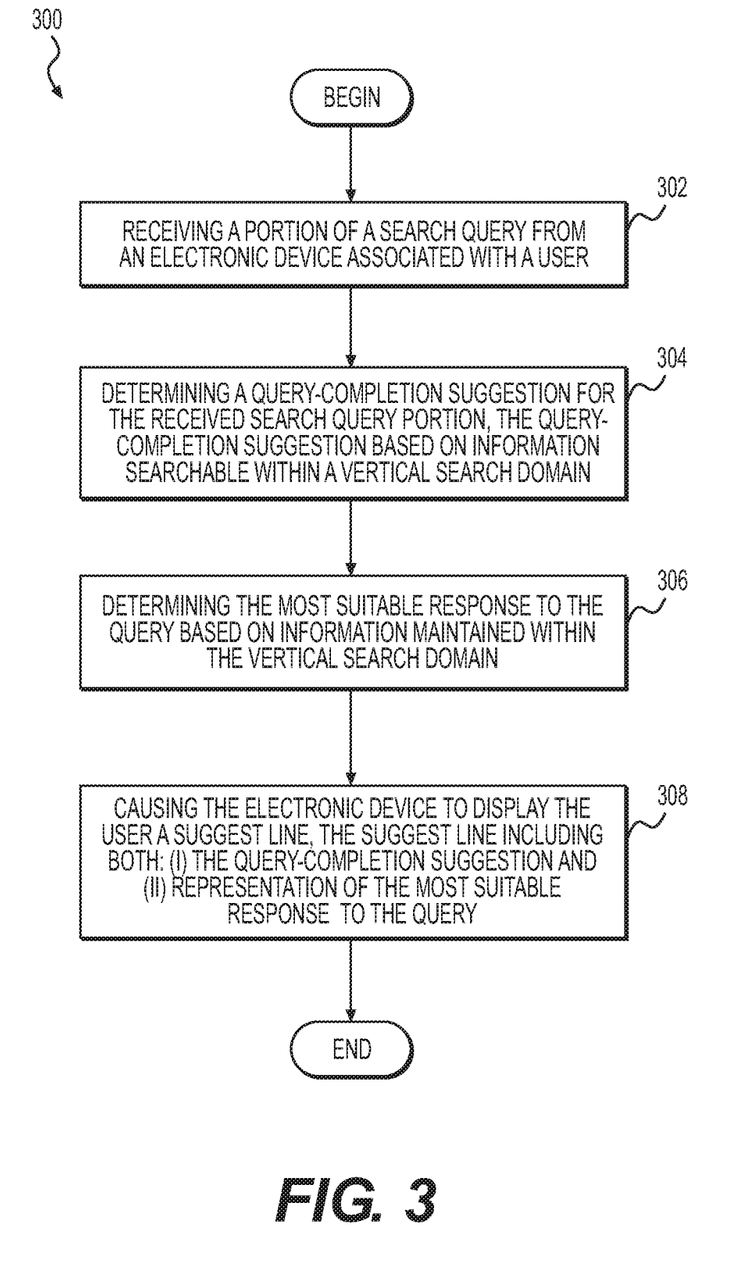
FIG. 3 depicts a block diagram of a method 300, the method 300 being executable within the system 100 of FIG. 1 and being implemented in accordance with non-limiting embodiments of the present technology.

Reference will now be made to FIG. 3, which depicts a block diagram of a method 300, the method 300 being implemented in accordance with a non-limiting embodiment of the present technology.

Step 302—Receiving a Portion of a Search Query from an Electronic Device Associated with a User The method 300 begins at step 302, where the server 116 receives a portion of a search query from the electronic device 102 associated with the user. The step 202 is executed in response to the user entering a portion of the search query into the electronic device 102 using the query interface 106 of the search application 104. As has been mentioned above, step 302 can be executed automatically, or the user may need to indicate her desire to implement step 302. The indication of the desire may be received in real time (for example, by the user clicking a dedicated button) or as part of setting or set up of the search application 104. The server 104 receives the portion of the search query over the communication link 112.

In some non-limiting embodiments of the present technology, the search query is transmitted to the server 116 as a standard URL (i.e. a link) encoded in HTML format. In other embodiments of the present technology, the search query is transmitted in a MYSQl script. Latter is particularly useful in, but is not limited to, those non-limiting embodiments where the server 116 is implemented as an SQL server.

The method then proceeds to execution of step 304.

Step 304—Determining a Query-Completion Suggestion for the Received Search Query Portion, the Query-Completion Suggestion Based on Information Searchable within a Vertical Search Domain The method 300 then proceeds to step 304, where the server 116 causes the suggest module 142 to determine a query-completion suggestion for the received search query portion, the query-completion suggestion based on information searchable within a vertical search domain.

As has been described above, the suggestion module 142 can access the plurality of vertical search modules 123 (or a subset of the plurality of vertical search modules 123). Continuing with the example provided herein, using the portion of the search query "Weather London, UK" as an example, the suggestion module 142 may determine (based on some of the algorithms described above) that the most popular (or most likely) queries associated with the "Weather London, UK" are "Weather London, UK today", "Weather London, UK tomorrow", "Weather London, UK average temperature" and "Weather London, UK general trends for the month".

Based on this appreciated most popular queries, the suggestion module 142 generates the four query-completion suggestions mentioned above.

The method then proceeds to execution of step 306.

Step 306—Determining the Most Suitable Response to the Query Based on Information Maintained within the Vertical Search Domain The method 300 then proceeds to execution of step 306, where the server 116 determines the most suitable response to the query based on the information maintained within the vertical search domain. As part of executing step 306, the server 116 causes the respective one of the plurality of vertical search modules 123 to perform a search, using the query-completion suggestion as a proxy for the search.

Continuing with the example, the server 116 executes each of the searches "Weather London, UK" are "Weather London, UK today", "Weather London, UK tomorrow", "Weather London, UK average temperature" and "Weather London, UK general trends for the month", which have been determined to be the four query-completion suggestions as part of step 304.

For each of the executed searches, the server 116 then determines the most suitable response. It should be noted that the most suitable response may take several forms. In some implementations, the most suitable response is actually the answer to the search query. For example, in response to the search query "Weather London, UK today", the most suitable response can be whatever the current weather conditions are (which in the example presented here is "+18 Celsius and overcast").

On the other hand, the most suitable response may be a link to a resource (where, for example, the most suitable response is too long or cumbersome to be placed into the suggest area 202). In yet further examples, the most suitable response may be a widget. For example, where the user is searching for songs and the most suitable response is determined to the audio file, the most suitable response may be a button displayed as part of the suggest area 202, which when pressed may cause the electronic device 102 to play the audio file associated with the song the user was searching for.

In some embodiments of the present technology, the server 116 may consider auxiliary information when determining the most suitable response. For example, where the query contained "average temperature"—the server 116 may appreciate that the query was submitted in August and, hence, determine that the user was likely looking for average temperatures in August.

The method 300 then proceeds to execution of step 308.

Step 308—Causing the Electronic Device to Display the User a Suggest Line, the Suggest Line Including Both: (i) the Query-Completion Suggestion and (ii) Representation of the Most Suitable Response to the Query The method 300 then executes step 308, where the server 116 causes the electronic device 102 to display to the user a suggest line, the suggest line including both: (i) the query-completion suggestion and (ii) representation of the most suitable response to the query.

More specifically and continuing with the examples mentioned above, the server 116 causes the electronic device 102 to display the aforementioned first suggest line 204, second suggest line 206, third suggest line 208 and fourth suggest line 210. To that extend, the server 116 sends to the electronic device a trigger, the trigger instrumental in causing the electronic device 102 to compile and present to the user the first suggest line 204, the second suggest line 206, the third suggest line 208 and the fourth suggest line 210. Again, it should be repeated here that the number of the suggest lines is merely illustrative and any other suitable number of lines, depending on circumstances, can be used.

The trigger further contains, for each of the first suggest line 204, the second suggest line 206, the third suggest line 208 and the fourth suggest line 210, information representative of (i) the query completion suggestion and (ii) representation of the most suitable response to that query.

Even though only a single trigger has been described, in alternative non-limiting embodiments of the present technology, the server 116 can transmit to the electronic device 102 more than one trigger. For example, the server 116 can transmit to the electronic device 102 one trigger for each one of the first suggest line 204, the second suggest line 206, the third suggest line 208 and the fourth suggest line 210.

Irrespective of how many triggers are transmitted and continuing with the example provided above, the trigger (or one of the plurality of triggers) will contain:

For the first suggest line 204: <Query_Completion Suggestion><today . . . ><Best_answer><+22 Celsius and sunny>, this being instrumental in causing the electronic device 102 to generate "today" as a portion of the first suggest line 204 generated as a query-completion suggestion and the "+22 Celsius and sunny" as a portion of the first suggest line 204 generated as the portion representative of the most suitable response to the query-completion suggestion.

For the second suggest line 206:

<Query_Completion_Suggestion><tomorrow . . . ><Best_answer><+18 Celsius and overcast>, this being instrumental in causing the electronic device 102 to generate "tomorrow" as a portion of the second suggest line 210 generated as a query-completion suggestion and the "+18 Celsius and overcast" as a portion of the second suggest line 210 generated as the portion representative of the most suitable response to the query-completion suggestion.

For the third suggest line 208: <Query_Completion_Suggestion><average temperature . . . ><Best_answer>
<www.weatherinformation.com\London_average_temperature_August>, this being instrumental in causing the electronic device 102 to generate "average temperature" is a portion of the first suggest line 208 generated as a query-completion suggestion and the "www.weatherinformation.com\London_average_temperature_August" as a portion of the third suggest line 208 generated as the portion representative of the most suitable response to the query-completion suggestion.

For the fourth suggest line 210: <Query_Completion_Suggestion><Best_answer><www.weathernetworkinformation.com>, this being instrumental in causing the electronic device 102 to generate as both a query-completion suggestion and the most suitable response to the query-completion suggestion to be collapsed into a single entity, which in this case is a link to a resource (which is a fictitious link).

In some embodiments of the present technology, the method can then loop back to execution of step of 302, where the server 116 monitors if the user has entered another portion of the search query, at which point the method 300 may be repeated based on the new portion of the search query. In response to the user continuing to type another portion of the search query, some of the lines within the suggest area 202 may be removed as longer responsive, new lines may be added, or some of the likes within the suggest area 202 can be changed.

Now, needless to say, despite having the answer presented right in the suggest area 202, the user may still be desirous of conducting a search based on the query-completion suggestion. According to embodiments of the present technology, the suggest area 202 is fully operational in the sense that the user can click on any one of the first suggest line 204, the second suggest line 206, the third suggest line 208 and the fourth suggest line 210 to be taken to the search results using the completed search query, as is generally known in the art.

In alternative non-limiting embodiments of the present technology another variation of the method 300 can be executed. The variation of the method for suggesting a query completion to a user comprises receiving a portion of a search query from the user, much akin to step 302 above.

The method further includes, akin to step 304, determining a first query-completion suggestion for the received search query portion, the first query-completion suggestion based on information searchable within a first vertical search domain. The, akin to step 306, the method further includes determining a second query-completion suggestion for the received search query portion, the second query-completion suggestion based on information searchable within a second vertical search domain.

Just like in step 308, the method then includes determining a first most suitable response to the query based on information maintained within the first vertical search domain and determining a second most suitable response to the query based on information maintained within the second vertical search domain.

The method then includes, similar to step 310, causing a user device to display to the user: on a first line of a suggest box, a first suggest line, the first suggest line including both: (i) the first query-completion suggestion and (ii) representation of the first most suitable response to the query; and on a second line of the suggest box, a second suggest line, the second suggest line including both: (i) the second query-completion suggestion and (ii) representation of the second most suitable response to the query.

According to another non-limiting embodiment of the present technology, there is provided a method for presenting a user a suggest area 202, the method executable at the electronic device 102 (of either the FIG. 1 or FIG. 3).

Figure 4:
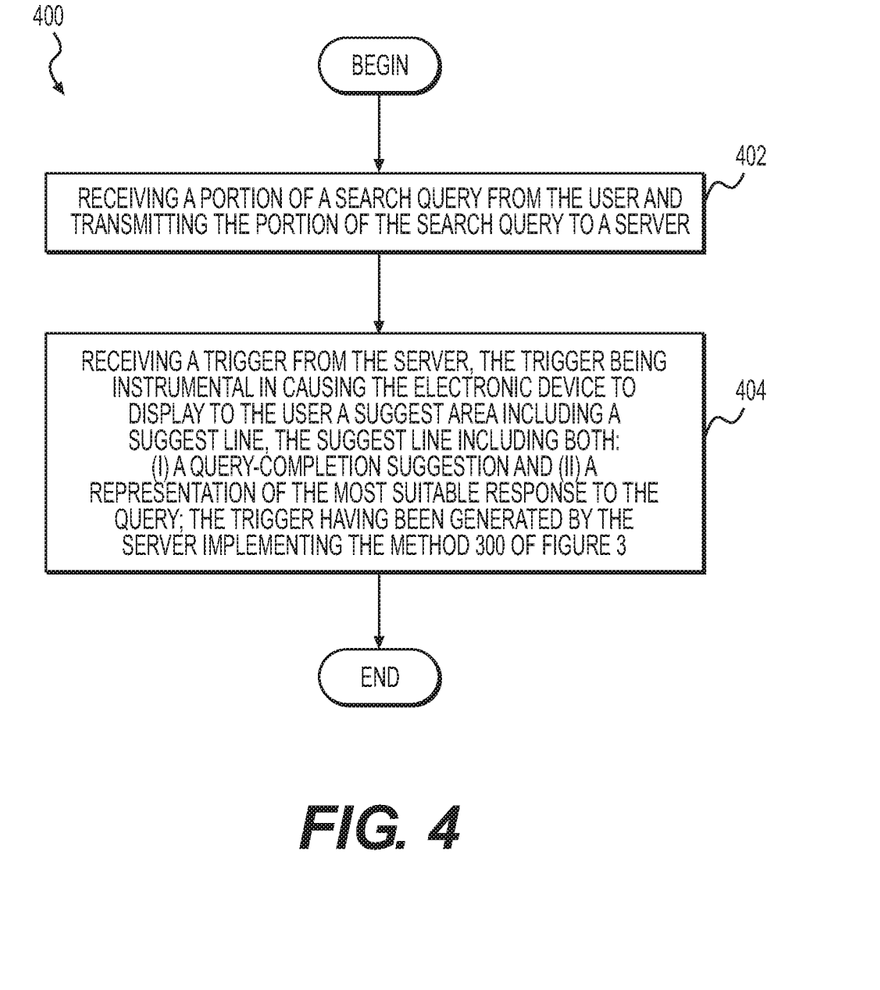
FIG. 4 depicts a block diagram of a method 400, the method 400 being executable within the system 100 of FIG. 1 and being implemented in accordance with non-limiting embodiments of the present technology.

With reference to FIG. 4, there is depicted a flow chart of a method 400, the method 400 being implemented in accordance with non-limiting embodiments of the present technology. Method 400 can be implemented on the electronic device 102. The electronic device 102 comprises computer usable information storage medium that includes computer-readable instruction, which instructions when executed, cause the electronic device 102 to execute the method steps of the method 400.

The method 400 starts at step 402, where the electronic device receives a portion of a search query from the user and transmits the portion of the search query to the server 116. How the electronic device 102 receives the search query and transmits same to the server 116 has been described at length above.

The method 400 then proceeds to step 404 where the electronic device 102 receives a trigger from the server 116, the trigger being instrumental in causing the electronic device 102 to display to the user a suggest line, the suggest line including both: (i) the query-completion suggestion and (ii) representation of the most suitable response to the query.

It is noted that the trigger has been generated by the server 116 by executing the method 300 described above.

Even though the above examples have been presented using weather vertical search is an example, embodiments of the present technology are not so limited. The vertical search domains (and the associated query-completion suggestions or the associated most suitable response to the query) may include some or all of: current scores in games, current time, traffic conditions, traffic jams nearby, current location, long distance telephone codes, currency converters, time difference between two geographical locations, distance between two geographical places, stock exchange information, flags of different countries, TV schedule, various trivia, working days in a month information, days left till an event and the like.

Some technical effects of non-limiting embodiments of the present technology may include provision of search results to the user, while minimizing interaction of the user with the search application 104 or number of clicks the user would have to make. Both of the above may result in a faster time between entering the search query and receiving a response thereto. It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of completing a search query, the method executable at a server, the method comprising:
   receiving a portion of the search query from an electronic device associated with a user;
   determining a first query-completion suggestion for the received search query portion, the first query-completion suggestion based on information searchable within a first vertical search domain;
   determining a second query-completion suggestion for the received search query portion, the second query-completion suggestion based on information searchable within a second vertical search domain;
   determining a first most suitable response to the search query based on information maintained within the first vertical search domain;
   determining a second most suitable response to the search query based on information maintained within the second vertical search domain;
   wherein said determining the first most suitable response and the second most suitable response comprises executing a first vertical search based on a first proxy search query and a second vertical search based on a second proxy search query, the first proxy search query comprising said portion of the search query and the first query-completion suggestion and the second proxy search query comprising said portion of the search query and the second query-completion suggestion;
   retrieving the first most suitable response to the first proxy search query from the first vertical search;
   retrieving the second most suitable response to the second proxy search query from the second vertical search; and
   causing the electronic device to display to the user:
   (a) a first suggest line on a first line of a suggest box, the first suggest line including both: (i) the first query-completion suggestion and (ii) a first representation of the first most suitable response;
   (b) a second suggest line on a second line of the suggest box, the second suggest line including both: (i) the second query-completion suggestion and (ii) a second representation of the second most suitable response to the query.

2. The method of claim 1, wherein the determining a first query-completion suggestion and a second query-completion suggestion comprises analyzing the portion of the search query by applying one or more of: (i) statistical popularity; (ii) user-specific popularity; (iii) how often a particular portion of the search query is typically used with determinative terms by other users; and (iv) other auxiliary information.

3. The method of claim 2, wherein said auxiliary information comprises one or more of time of day, day of the week, month of the year and holidays soon to come, or is representative of a dynamic parameter.

4. The method of claim 1, further comprising using auxiliary information to dynamically update the first query-completion suggestion and the second query-completion suggestion prior to causing the electronic device to display the first suggest line and the second suggest line.

5. The method of claim 1, wherein said determining the first most suitable response further comprises analyzing the search results from the first vertical search domain, and said determining the second most suitable response further comprises analyzing the search results from the second vertical search domain.

6. The method of claim 5, wherein said analyzing comprises one or more of: (i) identifying determinative words contained in the search query or the first or the second query-completion suggestion; (ii) identifying stop words contained in the search query or the first or the second query-completion suggestion; (iii) determining frequency of a given search query and a response from the first or the second vertical search domain when other users perform similar search queries; and (iv) applying auxiliary information logic and selecting the first or the second most suitable response using the auxiliary information.

7. The method of claim 1, wherein the first query-completion suggestion and the representation of the first most suitable response to the query are collapsed into a single entry within the first suggest line, and the second query-completion suggestion and the representation of the second most suitable response to the query are collapsed into a single entry within the second suggest line.

8. The method of claim 1, wherein said causing the electronic device to display to the user the first suggest line and the second suggest line comprises causing the electronic device to display a suggest area, the suggest area including the first suggest line and the second suggest line.

9. The method of claim 8, wherein said suggest area is a drop down menu from a search interface.

10. The method of claim 8, wherein said suggest area is different from a search query interface and a search result interface.

11. The method of claim 8, wherein said suggest area overlays one of a search interface and a search results interface.

12. The method of claim 1, further comprising receiving a second portion of the search query, and dynamically updating one or more of the first suggest line and the second suggest line, said dynamically updating being responsive to the second portion of the search query.

13. The method of claim 1, wherein responsive to the user clicking on the first suggest line, the method further comprises executing the search using the portion of the search query and the first query-completion suggestion and displaying a search result page responsive to the executed search.

14. The method of claim 13, wherein the search result page includes a search result representative of the first most suitable response.

15. The method of claim 1, wherein said method is executed automatically upon the user entering the portion of the search query.

16. The method of claim 1, wherein said representation of the first most suitable response comprises an answer to the search query and the first query-completion suggestion and said representation of the second most suitable response comprises an answer to the search query and the second query-completion suggestion.

17. The method of claim 1, wherein said representation of the first most suitable response comprises a first link to a first resource containing an answer to the search query and the first query-completion suggestion, and said representation of the second most suitable response comprises a second link to a second resource containing an answer to the search query and the second query-completion suggestion.

18. The method of claim 1, wherein said representation of the first most suitable response comprises a first button, which upon user clicking thereupon, causes the user to appreciate the answer to the search query and the first query-completion suggestion, and said representation of the second most suitable response comprises a second button, which upon user clicking thereupon, causes the user to appreciate the answer to the search query and the second query-completion suggestion.

19. The method of claim 1, wherein said determining the first query-completion suggestion is based on information searchable within the first vertical search domain and a third vertical search domain within a plurality of vertical search domains, the first vertical search domain and the third vertical search domain having been pre-selected in relevancy of the first vertical search domain and the third vertical search domain to the portion of the search query, or is based on information searchable within all of a plurality of vertical search domains.

20. The method of claim 1, wherein the first vertical search domain and the second vertical search domain are part of the same vertical search domain.

21. A system for completing a search query, the system comprising:
a server configured to:
receive a portion of the search query from an electronic device associated with a user;
determine a first query-completion suggestion for the received search query portion, the first query-completion suggestion based on information searchable within a first vertical search domain;
determine a second query-completion suggestion for the received search query portion, the second query-completion suggestion based on information searchable within a second vertical search domain;
determine a first most suitable response to the search query based on information maintained within the first vertical search domain;
determine a second most suitable response to the search query based on information maintained within the second vertical search domain,
wherein the first most suitable response and the second most suitable response are determined by executing a first vertical search based on a first proxy search query and a second vertical search based on a second proxy search query, the first proxy search query comprising said portion of the search query and the first query-completion suggestion and the second proxy search query comprising said portion of the search query and the second query-completion suggestion;

retrieve the first most suitable response to the first proxy search query from the first vertical search;

retrieve the second most suitable response to the second proxy search query from the second vertical search; and cause the electronic device to display to the user:

(a) a first suggest line on a first line of a suggest box, the first suggest line including both: (i) the first query-completion suggestion and (ii) a first representation of the first most suitable response to the query; and (b) a second suggest line on a second line of the suggest box, the second suggest line including both: (i) the second query-completion suggestion and (ii) a second representation of the second most suitable response to the query.

* * * * *